United States Patent [19]

Baut et al.

[11] 3,846,864
[45] Nov. 12, 1974

[54] WINDSCREEN WIPER FRAME

[76] Inventors: Jacques Baut, 213 boulevard du Souverain, 1160 Brussels, Belgium; Paul Journee, Chateau de Reilly, 60 Reilly, France

[22] Filed: Jan. 24, 1973

[21] Appl. No.: 326,456

[30] Foreign Application Priority Data
July 7, 1972  France .................72.24790

[52] U.S. Cl. .......................... 15/250.42, 15/250.39
[51] Int. Cl. ............................................. B60s 1/04
[58] Field of Search ........ 15/250.36, 250.39, 250.42, 15/250.37, 250.38, 250.41

[56] References Cited
UNITED STATES PATENTS
2,713,695  7/1955  Oishei ............................. 15/250.39
2,876,482  3/1959  Oishei ............................. 15/250.42
3,092,867  6/1963  Ziegler ............................ 15/250.42

Primary Examiner—Peter Feldman
Attorney, Agent, or Firm—Richards & Geier

[57] ABSTRACT

The invention pertains to a windscreen wiper having a frame comprising the combination of, at least: a main bridge; a swingle bar articulated at one end of the bridge and bearing at both its extremities on the elastic wiper blade; a secondary bridge articulated at the other end of said main bridge, one extremity of said secondary bridge, bearing on the wiper blade, and, articulated at the other extremity of said secondary bridge, an intercalary swingle bar both extremities of which bearing on said wiper blade.

4 Claims, 4 Drawing Figures

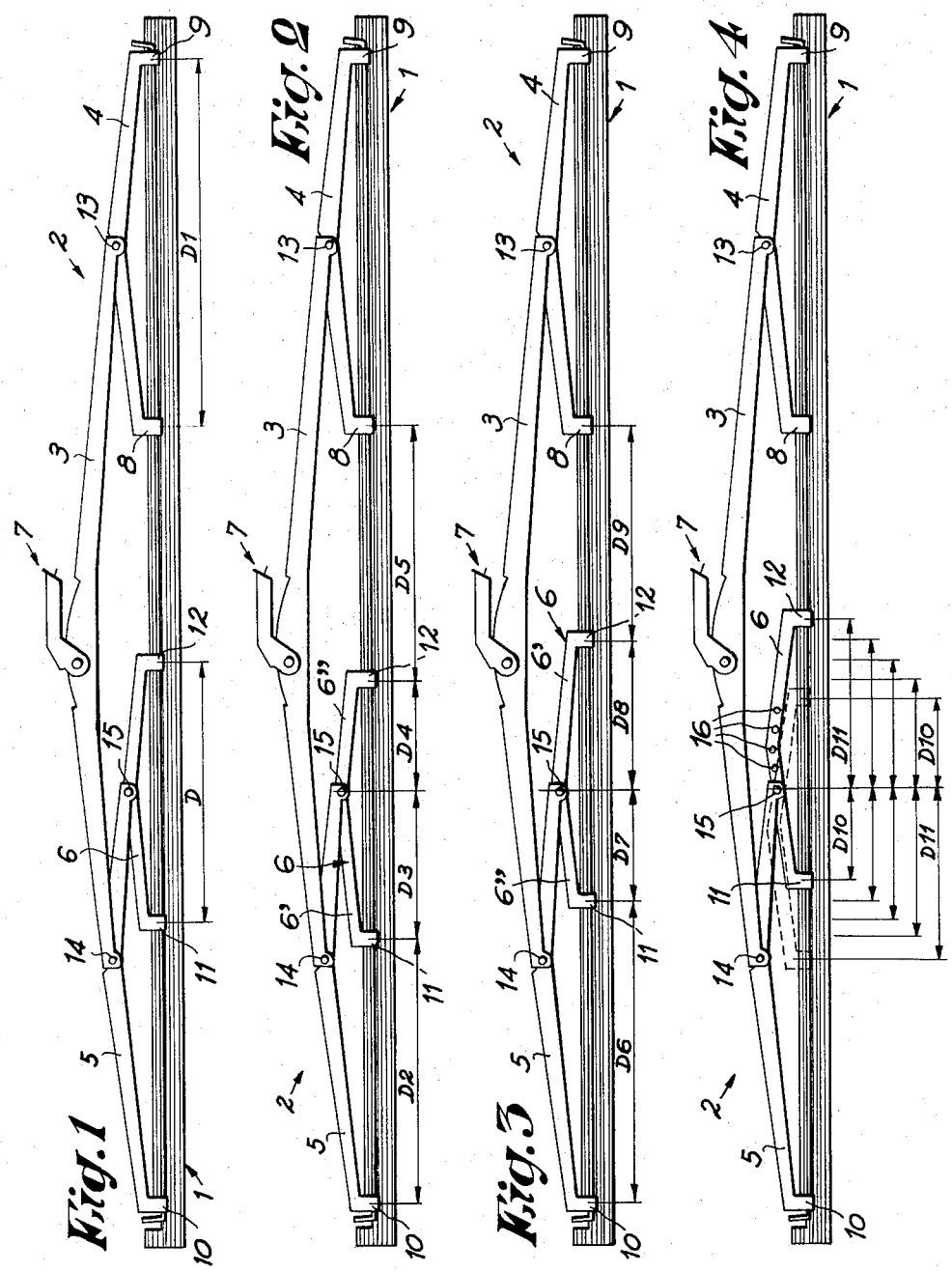

WINDSCREEN WIPER FRAME

This invention concerns the traditional auto windscreen wiper frames composed, in essence, of an elastic blade integrated to a usually metal frame, itself composed of a main bridge connected to the blade by a series of usually articulated elements.

A number of combinations of these wiper frame elements have already been suggested to improve the mechanical effectiveness of the blade, i.e., to maintain continuous contact and adequate pressure against all parts of the windscreen which sometimes have drastically variable radii of curvature.

The invention consists in a novel combination which has been found in practice to be able to ensure such a permanent contact with the windscreen, even for sharp curvature variations and to nevertheless afford a sufficient contact pressure between all parts of the wiper blade and the windshield.

As a result, a greater wiper efficiency is obtained, even when the vehicle is travelling at high speeds and substantial change in air pressure tend to resist the normal operation of the wiper.

These favorable results accrue from the fact that the wiper is constituted, in substance, by the combination of : a main bridge; a swingle bar hinged at one end of the main bridge and bearing on the elastic blade by its outer extremities; a secondary bridge hinged at the other end of said main bridge, one end of said secondary bridge bearing on said elastic blade, an intercalary swingle bar also bearing on the wiper blade by both extremities being hinged on the other end of said secondary bridge.

According to the invention, this characteristic disposition may advantageously be combined with a particular disposition of said second swingle bar which allows to modify the distribution of the bearing points on the elastic blade in function of the differences in sollicitations required by different shapes of the surfaces to be wiped. A differential swingle bar is thus realized, characterized in that its arms, located on both sides of its oscillation axis, are different in length. This difference may, in some embodiments, be made adjustable.

In practice, this characteristic considerably reduces manufacturing and stocking costs, considering that a relatively large number of combinations may be obtained with a given number of constitutive parts, whereby the windshield wiper, whilst remaining the same in its conception, may be better adapted to the particular requirements of each type of curved windshield.

It is therefore quite evident that the characteristics of the invention can be implemented in an almost infinite variety of forms.

It is therefore strictly by way of example that illustrative embodiments are described herebelow, with reference to the appended drawings, wherein:

FIG. 1 is a frontal view of one wiper according to this invention;

FIG. 2 is similar to FIG. 1, the wiper device having a differential swingle-bar.

FIG. 3 is similar to FIG. 2, the intermediate swingle bar being shown in its second characteristic position.

FIG. 4 is a frontal view of an alternate embodiment, wherein the differential swingle bar may take up a relatively large number of different positions.

The embodiment illustrated in FIG. 1 is composed of a wiper blade 1 and a wiper frame 2. In this instance, the frame is constituted by the combination of a main bridge 3 hinged at one end to a swingle bar 4 and at the other to a secondary bridge 5, itself hinged at one end to a smaller swingle bar 6 and to the blade at the other.

The central segment of the main bridge 3 bears the coupling device 7 by which the wiper frame can be connected to the free extremity of the swing-arm (not shown).

The coupling device 7 can be of any type and is not a part of the present invention. The swingle-bar 4 bears on the elastic blade 1 by both its extremities 8-9, the secondary bridge by its outer extremity 10 and the intercalary swingle bar 6 by its two extremities 11-12. The various articulations of this framework have axes 13-14 and 15 respectively.

In this first embodiment, the two arms of each swingle bar are of equal length. However, the span D of intercalary bar 6 is smaller than the span D1 of swingle bar 4.

By modifying the ratio D/D1, it is quite easy to adjust the distribution of bearing points on the elastic blade 1 to the geometrical specifications of the windscreen.

In the example of FIG. 2, all the elements of the first embodiment are to be found, but the intercalary swingle bar 6 is peculiar in that its two arms are of different length, $6'$-$6''$ respectively.

In the position shown in FIG. 2, the bearing points, from the bottom up of the blade, in operating position, are separated by the distances D2, D3, D4 and D5, respectively.

It is remarkable that by effecting a simple 180° inversion of the intercalary swingle bar 6, the distribution pattern is substantially modified becoming D6>D2, D7<D3, D8>D4 and D9<D5 (FIG. 3).

It will easily be understood that, under these conditions, substantial variations in the mechanical performances of the wiper blade may be obtained, depending on the position of the differential swingle bar 6.

At last, the same elements are to be found in FIG. 4. However, the differential swingle bar 6 is provided with a series of spaced holes 16, allowing to alter the relative position of said swingle bar, the extremities whereof being locatable at a distance from the projection of axis 15, varying from D10 to D11 and D11 to D10 respectively, thereby further increasing the possibilities to finely adjust the characteristics of the wiper to meet specific requirements.

It is clear from this non-limitative example that, with a limited number of components, it is possible to cover a fairly wide spectrum of applications in the field of auto windscreen wipers.

It goes without saying that various modifications may be brought by the man of the art to the exemplative embodiments described hereabove, without departing from the scope of the present invention.

What we claim is:

1. Windscreen wiper having a frame comprising the combination of, at least: a main bridge; a swingle bar articulated at one end of the bridge and bearing at both its extremities on the elastic wiper blade; a secondary bridge articulated at the other end of said main bridge, the outer extremity of said secondary bridge bearing on the wiper blade, and articulated at the inner extremity of said secondary bridge, an intercalary swingle bar, both extremities of which bearing on said wiper blade.

2. Wiper frame according to claim 1, wherein said two swingle bars are of the same length.

3. Wiper frame according to claim 1, wherein both swingle bars have arms of equal length.

4. Wiper frame according to claim 1 wherein said intercalary swingle bar is provided with series of spaced pivot shaft holes enabling the adjustment of arm length ratio to the windscreen specification.

* * * * *